United States Patent
Neal et al.

(10) Patent No.: US 8,816,633 B1
(45) Date of Patent: Aug. 26, 2014

(54) ENERGY HARVESTING CIRCUIT

(75) Inventors: Jolynnetta Aisha Neal, Chesterfield, MO (US); Raymond J. Slesinski, Arnold, MO (US)

(73) Assignee: The Boeing Company, Chicago, IL (US)

( * ) Notice: Subject to any disclaimer, the term of this patent is extended or adjusted under 35 U.S.C. 154(b) by 544 days.

(21) Appl. No.: 12/834,415

(22) Filed: Jul. 12, 2010

(51) Int. Cl.
*H02J 7/00* (2006.01)
*H01M 10/44* (2006.01)

(52) U.S. Cl.
USPC .......................................... 320/101; 320/138

(58) Field of Classification Search
USPC ......................... 320/102, 114, 121, 123, 101
See application file for complete search history.

(56) References Cited

U.S. PATENT DOCUMENTS

| | | | | |
|---|---|---|---|---|
| 5,838,138 A * | 11/1998 | Henty | ........................... | 320/107 |
| 7,017,055 B1 * | 3/2006 | Ho | ............................... | 713/300 |
| 7,081,693 B2 * | 7/2006 | Hamel et al. | ................. | 307/151 |
| 7,403,120 B2 * | 7/2008 | Duron et al. | ............... | 340/572.1 |
| 7,649,323 B1 * | 1/2010 | Kuhlmann et al. | ....... | 315/200 A |
| 2007/0090702 A1 * | 4/2007 | Schiller | ....................... | 310/75 C |
| 2007/0285244 A1 * | 12/2007 | Tucker et al. | .............. | 340/572.1 |
| 2007/0285256 A1 * | 12/2007 | Batra | ......................... | 340/572.8 |
| 2008/0150475 A1 * | 6/2008 | Kato et al. | .................... | 320/107 |
| 2008/0272733 A1 * | 11/2008 | Huang | .......................... | 320/102 |
| 2009/0160187 A1 * | 6/2009 | Scholte-Wassink | ............ | 290/44 |
| 2009/0309538 A1 * | 12/2009 | Xu | ................................. | 320/101 |

OTHER PUBLICATIONS

James et al., "An investigation of self-powered systems for condition monitoring applications", Elsevier Science Direct, Sensors and Actuators A 110 (2004) pp. 171-176.
Ottman et al., "Adaptive Piezoelectric Energy Harvesting Circuit for Wireless Remote Power Supply", IEEE Transactions on Power Electronics, vol. 17, No. 5, Sep. 2002, pp. 669-676.

* cited by examiner

*Primary Examiner* — Samuel Berhanu
*Assistant Examiner* — Steve T Chung
(74) *Attorney, Agent, or Firm* — Yee & Associates, P.C.

(57) ABSTRACT

The advantageous embodiments comprise an apparatus to manage a current. An alternating current is received from an energy harvesting device configured to generate the alternating current. The alternating current received from the energy harvesting device is converted to a direct current. A voltage of the alternating current is increased. The direct current is adjusted to a desired current.

21 Claims, 4 Drawing Sheets

ENERGY HARVESTING CIRCUIT

BACKGROUND INFORMATION

1. Field

The present disclosure relates generally to voltage regulation and, in particular, to a method and apparatus for managing current. Still, more particularly, the present disclosure relates to a method and apparatus for managing a current obtained from an energy harvesting device.

2. Background

To support the world's growing consumer market, there is an unprecedented need to track the flow of products as they are manufactured in one country, transported across the world, and then consumed in another country. Manufacturers, distributors, and retailers have relied on bar code labels to track their products and manage their inventories. While barcode labels have many advantages, including low cost, they also have several disadvantages. For example, the bar code label of the product may be in a specific orientation and proximity to the reader when the bar code label is correctly read. Moreover, printed bar code labels are limited by the amount of data that they can store.

Radio frequency identification (RFID) provides the ability to store and retrieve significant amounts of information about a product. Radio frequency identification tags are generally grouped into three categories: passive, active, and semi-passive. Passive tags do not have an internal power source. Instead, they rely on inducing an electrical current in the tag's antenna from the reader's incoming RF signal. Semi-passive tags are similar to active tags in that they have their own power source, but the battery only powers the micro-chip and does not broadcast a signal. Active tags use a power source, such as a battery, to power the micro-chip and broadcast the signal to the reader.

Batteries used to power active tags may run out of power and need to be replaced. Replacing the battery may be difficult and costly. Furthermore, in an environment where there are many tags, replacing all of the tags or batteries on the tags may be time consuming and costly.

Therefore, it would be advantageous to have a method and apparatus that takes into account one or more of the issues discussed above, as well as possibly other issues.

SUMMARY

In one advantageous embodiment, a method is present to manage a current. The method comprises receiving an alternating current from an energy harvesting device configured to generate the alternating current. The alternating current received from the energy harvesting device is converted to a direct current. A voltage of the alternating current is increased. The method comprises adjusting the direct current to a desired current.

In another advantageous embodiment, an apparatus comprises a first device configured to receive an alternating current from an energy harvesting device and a second device configured to adjust the direct current to a desired current. The first device is configured to convert the alternating current to a direct current to increase a voltage of the alternating current when converted to the direct current.

In yet another advantageous embodiment, an apparatus comprises an energy storage device, an energy harvesting device for supplying a current to the energy storage device, a first device, and a second device. The energy harvesting device is capable of capturing energy from sources external to the device. The first device is configured to receive an alternating current from the energy harvesting device. The first device is configured to convert the alternating current to a direct current. The first device is configured to increase a voltage of the alternating current when converted to the direct current. The second device is configured to adjust the direct current to a desired current for storage of the desired current in the energy storage device.

The features, functions, and advantages can be achieved independently in various embodiments of the present disclosure, or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
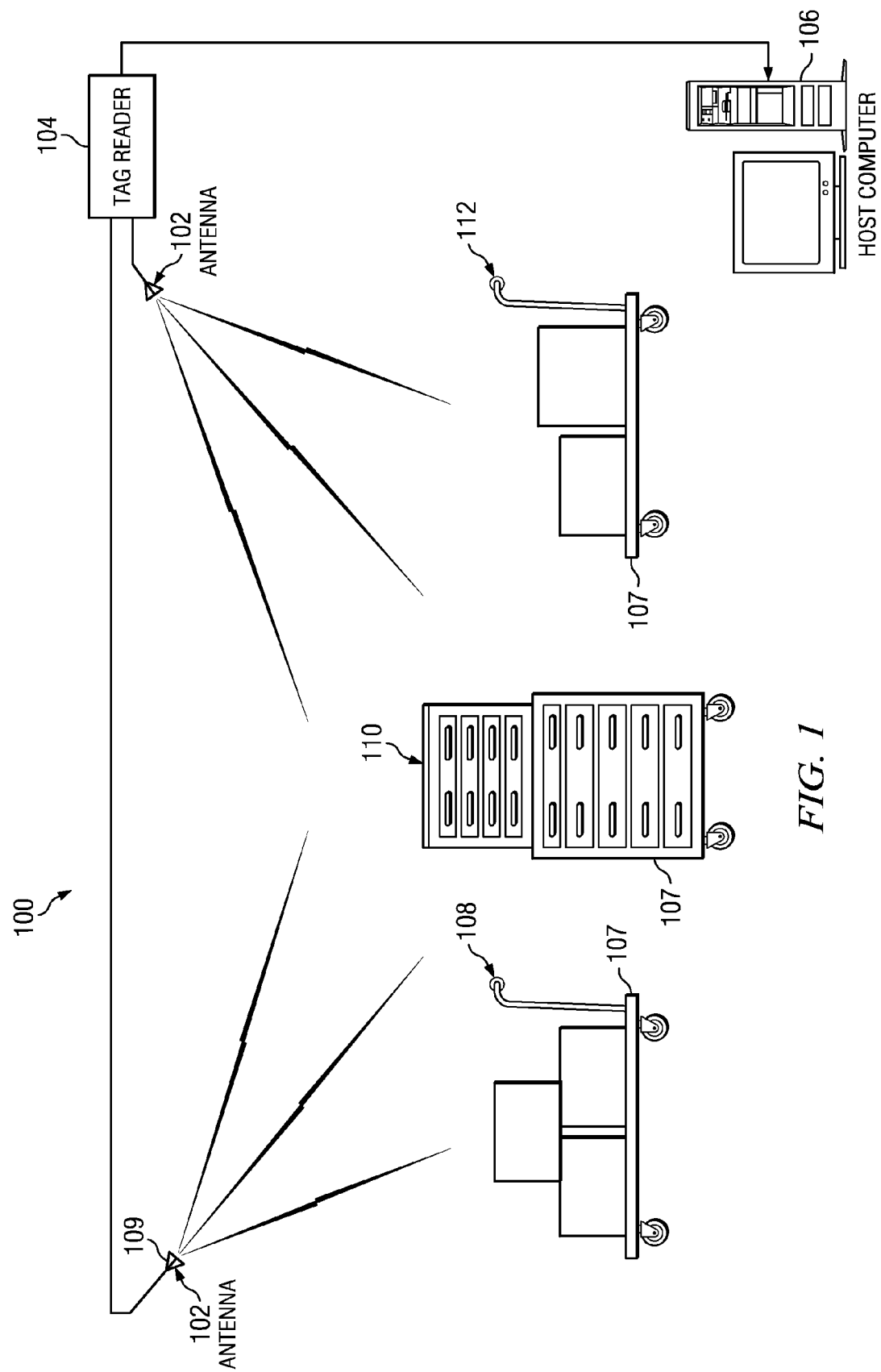
FIG. 1 is an illustration of a system for tracking the movement of material being transported by one or more material conveyance devices as depicted in accordance with an advantageous embodiment.

Turning first to FIG. 1, an illustration of a system for tracking the movement of material being transported by a number of material conveyance devices as depicted in accordance with an advantageous embodiment is shown. System 100 may include number of antennas 102, number of tag readers 104, a host computer 106, and number of material conveyance devices 107 with radio frequency identification device tags which are actively powered. In the illustrative examples, "a number" when used to refer to items means one or more items. For example, number of antennas 102 means one or more antennas.

For example, antenna 109 in number of antennas 102 transmits and receives signals from conveyance devices 108-112 in number of conveyance devices 107. Antenna 102 is connected to tag reader 104; however antenna 102 could be connected to a separate or independent tag reader depending upon the specific implementation. Antenna 102 may be positioned or installed to cover a specific region or zone where conveyance devices 108-112 are located or used. For example, a region of a warehouse or production line. Furthermore, antenna 102 could be positioned in a warehouse entryway, walkway, pass-through, or other high traffic area so that when conveyance devices 108-112 enter or leave the warehouse, the presence of conveyance devices 108-112 is detected.

Tag reader 104 detects and communicates with conveyance devices 108-112 and determines the distances between conveyance devices 108-112 and antenna 102. For example, tag reader 104 may transmit an interrogation signal to number of conveyance devices 107 and then listen for a response. Conveyance devices 108-112 may respond with a unique identification code. Tag reader 104 may receive the unique identification code and determine the identity of number of conveyance devices 107 using a lookup table or database. The lookup table or database could include other types of information such as: the type and quantity of material being conveyed, the conveyance device's destination, whether the conveyance device is authorized to be in the area, or other information of value. Alternatively, material conveyance devices 108-112 and tag reader 104 may employ digital signal processing to communicate directly with one another. For example, the amount of energy stored in energy storage device, status of the power generator, power regulator, and energy storage device. In an alternate embodiment, conveyance devices 108-112 could initiate the communication by transmitting a signal to tag reader 104 on, for example, a periodic basis, or when it senses movement, and the tag reader 104 could respond.

Host computer 106 communicates with tag reader 104 through a wired or wireless communications interface. Host computer 106 collects, organizes, and stores the data collected by tag reader 104. Host computer 106 could be a laptop computer, a personal computer, a server, a work station, a hand held device, or any other suitable computing device. Host computer 106 may also communicate with other computing devices over a communications network, such as a local area network (LAN), a wide area network (WAN), the internet, or any other suitable communications network.

The distance between conveyance devices 108-112 and antenna 102 can be calculated based on the time it takes for a signal to be transmitted to conveyance devices 108-112 and when a response is received by tag reader 104. For example, tag reader 104 could interrogate each of conveyance devices 108-112 using each antenna 102, and based on the transmission time, determine the distance between each of conveyance devices 108-112 and antennas 102. Tag reader 104 could then triangulate the various distances to calculate the position of each conveyance device 108-112.

In an alternate embodiment, conveyance devices 108-112 include a number of sensors to determine if individual parts, components, or assemblies have been consumed or removed from the material conveyance device 108-112. For example, conveyance devices 108-112 may comprise sensors such as, but not limited to, proximity sensors, contact sensors, mass sensors, thermal sensors, and other types of sensors. Information obtained from the sensors could be stored for subsequent transmission or broadcast real-time by conveyance devices 108-112 to tag reader 104. Tag reader 104 could compile and process the information and relay the information to the host computer 106. Alternatively, tag reader 104 could convey the raw information to the host computer 106 and the host computer 106 could compile and process the information. Host computer 106 could then send the processed information over a local area network, a wide area network, a wireless communications network, a phone line, or any other suitable communications network, to parts suppliers, material schedulers, or material buyers for further action.

The different advantageous embodiments recognize and take into account a number of different considerations. A number, as used herein with reference to items, refers to one or more items. For example, a number of considerations are one or more considerations.

The different advantageous embodiments recognize and take into account that batteries used to power active tags may run out of power and need to be replaced. Replacing the battery may be difficult and costly. Furthermore, in an environment where there are many tags, replacing all of tags or batteries on the tags may be time consuming and costly.

The advantageous embodiments comprise a method and apparatus to manage a current. An alternating current is received from an energy harvesting device configured to generate the alternating current. The alternating current received from the energy harvesting device is converted to a direct current. A voltage of the alternating current is increased. The direct current is adjusted to a desired current.

Figure 2:
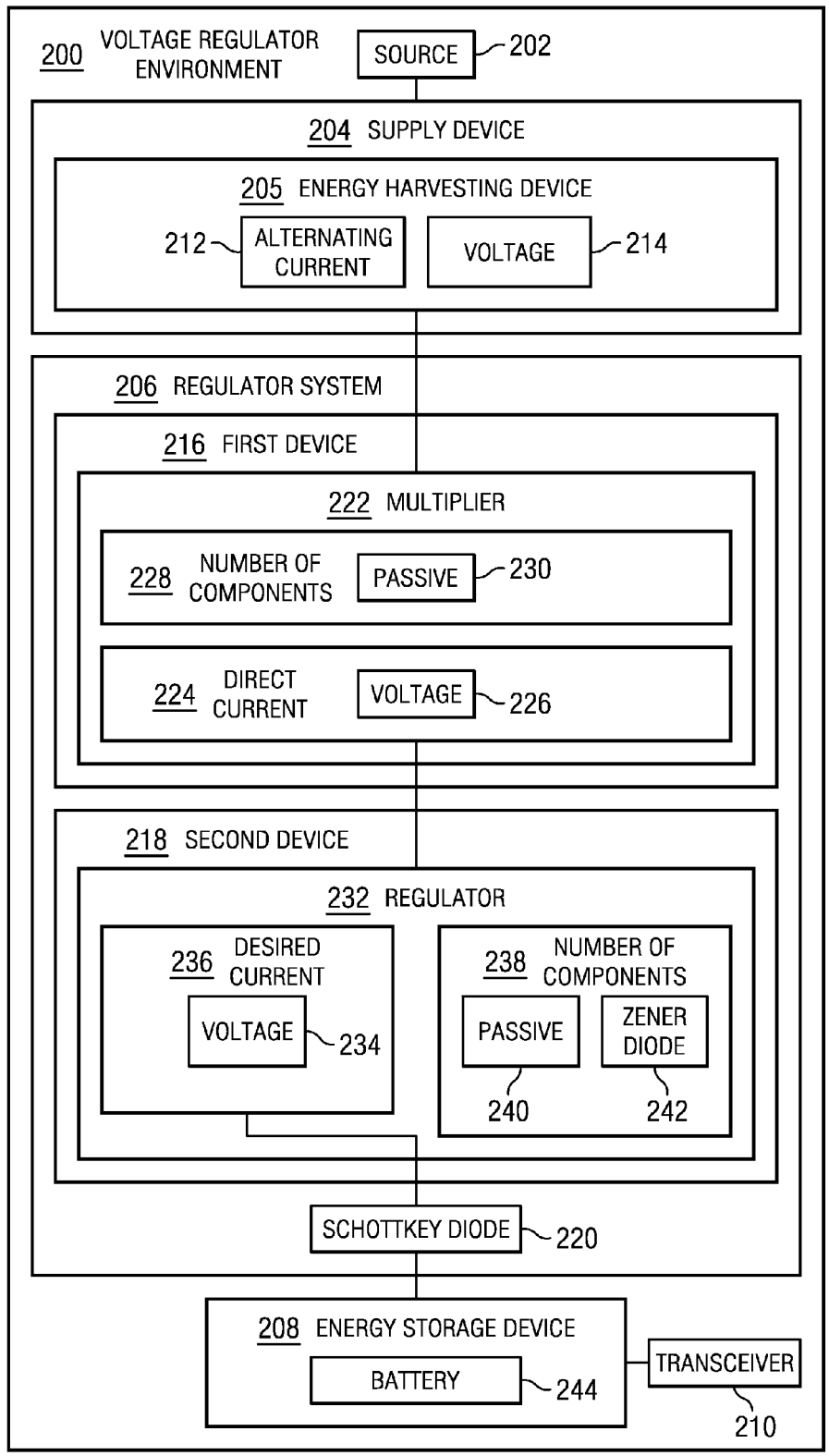
FIG. 2 is an illustration of a voltage regulator environment as depicted in accordance with an advantageous embodiment.

Turning to FIG. 2, an illustration of a voltage regulator environment is depicted in accordance with an advantageous embodiment. In these illustrative examples, voltage regulator environment 200 is an environment for regulating a voltage.

Voltage regulator environment 200 comprises source 202, supply device 204, regulator system 206, energy storage device 208, and transceiver 210. Voltage regulator environment may be used to regulate the voltage of a radio frequency identification device on conveyance devices 108-112 as shown in FIG. 1.

Source 202 is any source of energy. For example, source 202 may be solar power, thermal energy, wind energy, kinetic energy, water energy, or other types of energy sources. Sources of energy may be from a conveyance device, such as conveyance devices 108-112 as shown in FIG. 1.

Supply device 204 is a device that takes energy from an energy source and creates an electric current from the energy. Supply device 204 may receive energy from source 202 and generate alternating current 212 with voltage 214. Energy harvesting device 205 may be one example of supply device 204. Energy harvesting device 205 may be a device that generates energy from an environment around energy harvesting device 205. Energy harvesting device 205 generates energy from a source external to energy harvesting device 205. Energy harvesting device 205 generates electrical energy that is stored from other forms of energy in the environment. For example, energy harvesting device 205 generates electrical energy from solar power, thermal gradients, wind, salinity gradients, kinetic energy and/or other forms of energy sources that may be present in the environment in which the energy harvesting device is located.

Regulator system 206 is a system that can regulate a voltage of a current, such as alternating current 212. Regulator system 206 receives alternating current 212 from supply device 204 and sends a regulated voltage to energy storage device 208. Regulator system 206 comprises first device 216, second device 218, and Schottky diode 220.

First device 216 is a voltage multiplier, such as multiplier 222. Multiplier 222 converts alternating current 212 to direct current 224. Direct current 224 has voltage 226. Multiplier 222 also increases voltage 214 of alternating current 212 so that voltage 226 of direct current 224 is higher than voltage 214 of alternating current 212.

First device 216 has number of components 228. Number of components 228 may be electronic components that affect direct current 224 and/or voltage 226 in some manner. Number of components 228 may be components such as a resistor, capacitor, transistor, diode, and other similar components.

Number of components 228 may all be passive 230. A component is passive when it consumes energy, but does not produce energy.

Second device 218 is a voltage regulator, such as regulator 232. Regulator 232 adjusts voltage 226 to a substantially constant voltage level. Regulator 232 adjusts voltage 226 to voltage 234 of desired current 236. Voltage 234 of desired current 236 may be any voltage desired. For example, voltage 234 of desired current 236 may be a voltage needed to power energy storage device 208.

Second device 218 has number of components 238. Number of components 238 may be electronic components that affect direct current 224 and/or voltage 226 in some manner. Number of components 238 may be components such as a resistor, capacitor, transistor, diode, and other similar components. Number of components 238 may all be passive 240.

Number of components may comprise zener diode 242. Zener diode 242 is a type of diode that permits current not only in the forward direction, but also in the reverse direction. In regulator 232, zener diode 242 may pull a portion of direct current 224 from direct current 224 to keep direct current 224 around desired current 236.

Schottky diode 220 is a type of diode that has a low voltage drop. Schottky diode 220 maintains direct current 224 in one direction through energy storage device 208.

Energy storage device 208 is a type of device that can store energy. Energy storage device 208 may be battery 244. Battery 244 is used to power devices such as transceiver 210. Battery 244 may be used to power a radio frequency identification device.

Transceiver 210 receives and transmits signals. Transceiver 210 may be used to receive and transmit signals to and from a radio frequency storage device.

The illustration of voltage regulator environment 200 in FIG. 2 is not meant to imply physical or architectural limitations to the manner in which different advantageous embodiments may be implemented. Other components in addition to, and/or in place of, the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, energy storage device 208 may be located in various places. Energy storage device 208 may be located on regulator system 206. Additionally, for example, multiplier 222 and regulator 232 may be located on different regulator systems.

Figure 3:
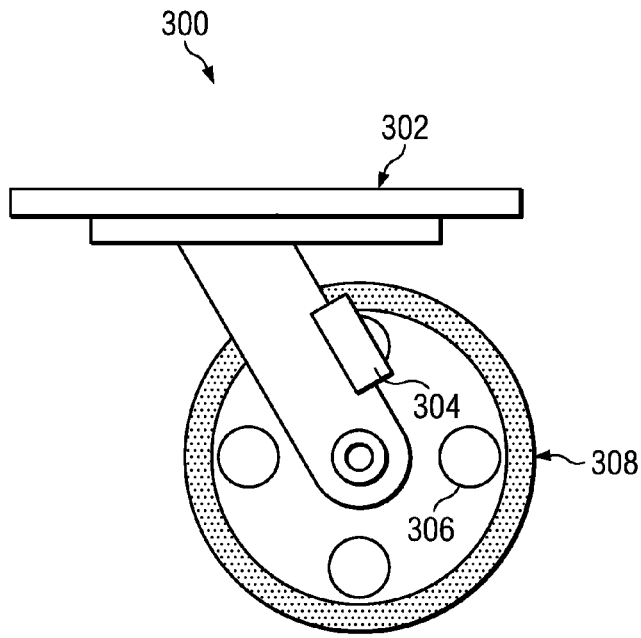
FIG. 3 is an illustration of an energy harvesting environment as depicted in accordance with an advantageous embodiment.

FIG. 3 illustrates an energy harvesting environment as depicted in accordance with an advantageous embodiment. Energy harvesting environment 300 is an environment where an energy storage device may collect energy from surrounding sources. Energy harvesting environment 300 includes wheel assembly 302, radio frequency identification device 304, and a number of magnets 306 that are attached to a wheel 308. Energy harvesting environment 300 could be attached to material conveyance devices, such as conveyance devices 108-112 as shown in FIG. 1 which are used to transport materials, products, or assemblies.

As conveyance devices 108-112, in FIG. 1, are moved from one location to another, wheel 308 rotates and the magnet(s) 306 sweep past radio frequency identification device 304. The rotating magnets 306 emit an electro-magnetic field which induces an electrical current in a wire or coil residing in radio frequency identification device 304. The alternating current output may be rectified, converted, to a direct current output by a diode bridge, such as multiplier 222 of FIG. 2. The direct current output is regulated based on the requirements of the radio frequency identification device 304. The regulated direct current output is then used to either recharge an energy storage device residing in the radio frequency identification device 304 or directly power the device. Alternatively, magnets 306 could be stationary and the radio frequency identification device 304 could rotate relative to the magnets. For example, radio frequency identification device 304 could be coupled to wheel 308.

Figure 4:
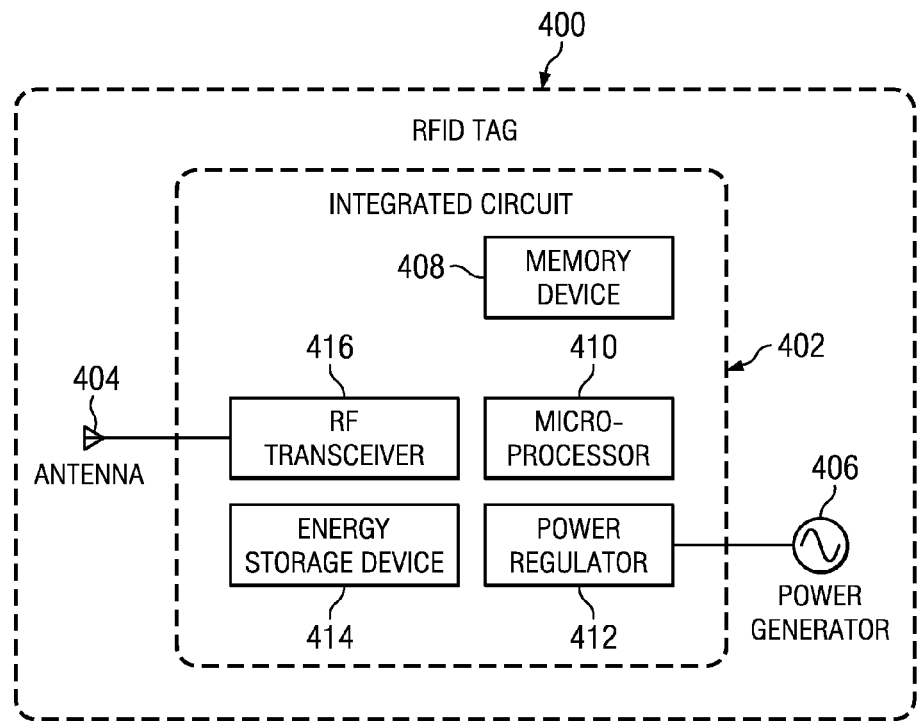
FIG. 4 illustrates a radio frequency identification device tag as depicted in accordance with an advantageous embodiment.

FIG. 4 illustrates radio frequency identification device tag in accordance with an embodiment as depicted in accordance with an advantageous embodiment. Radio frequency identification device tag 400 could be attached to a product, a material conveyance device, or any other suitable device or component. A product may be, but not limited to, a library book, apparel, access badge, or pharmaceutical item. A conveyance device may be, but not limited to, cart, pallet, dolly, or roll-a-way. Radio frequency device tag 400 may be used in energy harvesting environment 300 as shown in FIG. 3 or voltage regulator environment 200 as shown in FIG. 2.

Radio frequency identification device tag 400 may include integrated circuit 402, antenna 404 for communicating with a tag reader, and power generator 406 for powering radio frequency identification device tag 400. Integrated circuit 402 contains memory device 408, micro-processor 410, power regulator 412, energy storage device 414, and radio frequency transceiver 416 for communicating with a tag reader. Power regulator 412 may be one example of one implementation of regulator system 206 of FIG. 2. Energy storage device 414 may be one example of one implementation of energy storage device 208 of FIG. 2. Radio frequency transceiver 416 may be one example of one implementation of transceiver 210 of FIG. 2.

Antenna 404 could be in a number of configurations and sizes depending upon the specific application and frequency used to communicate with the tag reader. For example, radio frequency identification device tag 400 may employ a dipole antenna when transmitting at high frequencies such as 13.56 MHz.

Power generator 406 converts mechanical energy into electrical energy which may be used to recharge energy storage device 414 and/or power radio frequency identification device tag 400 directly. Generators, alternators, and other power generating devices employ electromagnetic induction to convert mechanical energy into electrical energy. A rotating magnet, called the "rotor", turns within a stationary set of conductors wound in the shape of a coil, called the "stator". As the rotor turns relative to the stator, a magnetic field cuts across the stator's conductors and generates an electrical current. The alternating current (AC) output may then be presented to a diode bridge which rectifies the alternating current output to a direct current (DC) output.

Power generator 406 could employ conventional electromagnetic induction to convert mechanical energy into electrical energy. This could include the rotational energy created by a rotating wheel, linear energy created by moving mass, angular energy also created by a moving mass, or any other suitable source of mechanical energy. Alternatively, the generator could employ piezoelectric materials to generate an electrical potential by subjecting the piezoelectric materials to mechanical stress.

Integrated circuit 402 contains memory device 408, micro-processor 410, power regulator 412, energy storage device 414, and radio frequency transceiver 416. Memory device 408 stores information regarding radio frequency identification device tag 400, as well as the item that the radio frequency identification device tag 400 is attached. For example, memory device 408 could store a unique identification number associated with the tag, the quantity of energy stored by energy storage device 414, the type and quantity of material being conveyed, the material's lot number, the material's expiration date, the transport environment, or any other suitable data or information.

Micro-processor 410 manages the communications with the reader, monitors the state of energy storage device 414, and reads and writes data to memory device 408. For example, if the energy level of storage device 414 falls below a threshold value, micro-processor 410 may warn the tag reader that it may no longer be able to communicate with the tag reader. Alternatively, if for some reason, power generator 406, power regulator 412, or storage device 414 were not operating properly, micro-processor 410 may warn the tag reader of an existing or impending component failure.

A generator's output voltage generally varies directly with the speed that it rotates, since material conveyance devices are typically moved about at different speeds. A generator which is driven by the movement of the conveyance device will rotate at various speeds, and accordingly its output voltage will vary. A voltage regulator is designed to maintain a constant voltage by comparing the actual output voltage to a fixed reference voltage. If the output voltage is too low, the voltage regulator produces a higher voltage. Conversely, if the output voltage is too high, the voltage regulator produces a lower voltage. Accordingly, the output voltage is held at a constant voltage. Voltage regulators may include linear regulators, switching regulators, silicon controlled rectifiers, or a combination.

Power regulator 412 regulates the power produced by power generator 406 to ensure that energy storage device 414 is charged properly and not damaged. For example, if the power generator 406 produced an AC current and energy storage device 414 was a battery, power regulator 412 could be designed to limit the current by employing a limiting resistor and perform an alternating current to direct current conversion by employing a diode bridge. Power regulator 412 then may trickle charge energy storage device 414 to ensure that energy storage device 414 is not damaged during charging.

Energy storage device 414 could be a battery, a capacitor, or any other suitable electrical energy storage device. Energy storage device 414 may be rechargeable so that the operational life of radio frequency identification device tags 400 can be extended through recharging.

Radio frequency transceiver 416 receives and transmits signals in response to the tag reader. Radio frequency transceiver 416 may include a wake-up circuit for waking up radio frequency identification device tag 400 in response to signals from the tag reader, a receiver for receiving and decoding signals from the receiver, and a transmitter for transmitting signals to the tag reader.

Figure 5:
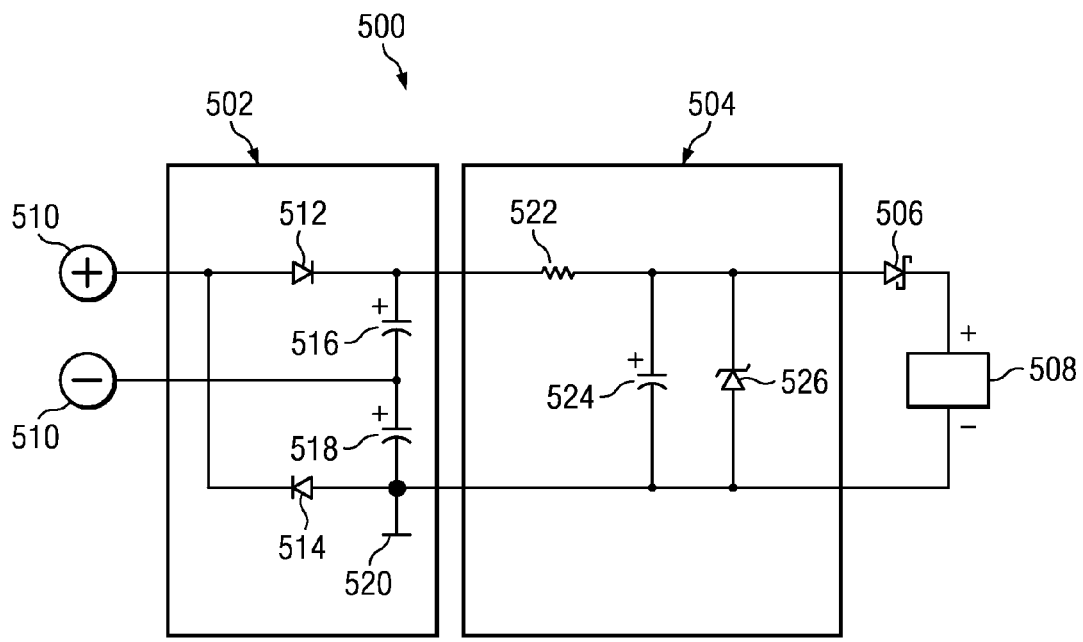
FIG. 5 is an illustration of a regulator circuit as depicted in accordance with an advantageous embodiment.

Turning to FIG. 5, an illustration of a regulator circuit is depicted in accordance with an advantageous embodiment. Regulator circuit 500 may be one example of one implementation of regulator system 206 of FIG. 2. Regulator circuit 500 controls the voltage and current coming from a supply device.

Regulator circuit 500 comprises voltage multiplier 502, voltage regulator 504, Schottky diode 506, and battery 508. Voltage multiplier 502 may be one example of one implementation of multiplier 222 of FIG. 2. Voltage regulator 504 may be one example of one implementation of regulator 232 of FIG. 2. Schottky diode 506 may be one example of one implementation of Schottky diode 220 of FIG. 2. Battery 508 may be one example of one implementation of battery 244 of FIG. 2.

Voltage multiplier 502 receives a current from terminals 510 of an energy supply device. Voltage multiplier 502 comprises diodes 512 and 514, capacitors 516 and 518, and ground 520. Voltage regulator 504 receives a current from voltage multiplier 502. Voltage regulator 504 comprises resistor 522, capacitor 524, and zener diode 526. Schottkey diode 506 regulates a direction of the current running through battery 508.

Figure 6:
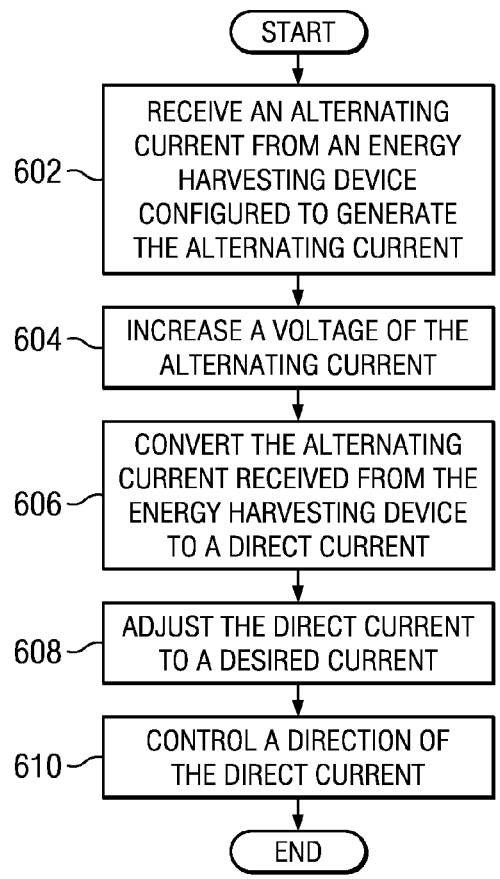
FIG. 6 is an illustration of a flowchart for managing a current as depicted in accordance with an advantageous embodiment.

Turning to FIG. 6, an illustration of a flowchart for managing a current is depicted in accordance with an advantageous embodiment. The process may be used in voltage regulator environment 200 of FIG. 2. The process may use a voltage multiplier, such as, for example, multiplier 222 of FIG. 2. The process may use a voltage regulator, such as, for example, regulator 232 of FIG. 2. The process may use an energy storage device, such as, for example, energy storage device 208 of FIG. 2.

The process begins by receiving an alternating current from an energy harvesting device configured to generate the alternating current (operation 602). The energy harvesting device captures energy from sources external to the device. The energy harvesting device captures energy from a source selected from the group consisting of solar power, thermal energy, wind energy, kinetic energy, and water energy. A voltage multiplier increases a voltage of the alternating current (operation 604). The voltage multiplier also converts the alternating current received from the energy harvesting device to a direct current (operation 606). A voltage regulator adjusts the direct current to a desired current (operation 608). Increasing the voltage of the alternating current may be performed when the alternating current is converted to the direct current. The voltage multiplier and voltage regulator use components which are passive. The voltage regulator adjusts a voltage of the direct current to a voltage of the desired current. The voltage regulator removes a portion of the direct current by running the portion of the direct current through a diode to obtain the desired current. The desired current is the direct current without the portion of the direct current. A Schottky diode controls a direction of the direct current (operation 610).

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The advantageous embodiments comprise a method and apparatus to manage a current. An alternating current is received from an energy harvesting device configured to generate the alternating current. The alternating current received from the energy harvesting device is converted to a direct current. A voltage of the alternating current is increased. The direct current is adjusted to a desired current.

The efficiency of a warehouse or production environment could be significantly improved if the materials in the warehouse or production environment could be easily tracked and identified. Specifically, a robust material tracking and identification system could ensure that materials are not misplaced or lost, that they arrive at the proper location on time, and that the proper amount of material is on hand.

The different illustrative embodiments provide a voltage regulator to manage the current and voltage coming from an energy harvesting device. Additionally, the different illustrative embodiments provide a way to charge a battery without damaging the battery.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications, as are suited to the particular use contemplated.

What is claimed is:

1. An apparatus comprising:
    an energy harvesting device configured to supply a current to an energy storage device, such that the energy harvesting device is capable of capturing energy from sources external to the energy harvesting device;
    a voltage multiplier directly connected in series to the energy harvesting device, the voltage multiplier configured to: receive an alternating current from the energy harvesting device, convert the alternating current to a direct current, and increase a voltage of the alternating current converted to the direct current;
    a voltage regulator directly connected in series to the voltage multiplier, the voltage regulator configured to adjust the direct current to a desired current for storage of the desired current in the energy storage device, such that the voltage regulator comprises a zener diode; and
    a Schottky diode, configured: to receive current from the voltage regulator, immediately following in sequence and directly connected to the zener diode, and immediately preceding and directly connected to the energy storage device.

2. The apparatus of claim 1, wherein the energy storage device comprises a battery.

3. The apparatus of claim 1, further comprising the voltage regulator configured to charge the energy storage device at a rate substantially equal to a rate of depletion of the energy storage device.

4. The apparatus of claim 1 further comprising:
    a transceiver which is configured to transmit a signal and receive energy from the energy storage device.

5. An apparatus comprising:
    a voltage multiplier directly connected in series to, and configured to receive an alternating current from, an energy harvesting device, the voltage multiplier configured to convert the alternating current to a direct current and increase a voltage of the alternating current when converted to the direct current;
    a voltage regulator directly connected in series to the and voltage multiplier, the voltage regulator configured to adjust the direct current to a desired current for storage of the desired current in an energy storage device, such that the voltage regulator comprises a zener diode; and
    a Schottky diode immediately following in sequence and directly connected to the zener diode, the zener diode comprised by the voltage regulator; and
    the energy storage device immediately following in sequence and directly connected to the Schottky diode.

6. The apparatus of claim 5 further comprising:
    the energy harvesting device configured to generate the alternating current.

7. The apparatus of claim 6, wherein the energy harvesting device captures energy from sources external to the energy harvesting device.

8. The apparatus of claim 6, wherein the energy harvesting device captures energy from a source selected from the group consisting of solar power, thermal energy, wind energy, kinetic energy, and water energy.

9. The apparatus of claim 5, further comprising:
    the voltage regulator configured to adjust a first voltage of the direct current to a second voltage of the desired current.

10. The apparatus of claim 5, wherein the voltage regulator comprises:
    the zener diode configured to remove a portion of the direct current to obtain the desired current, wherein the desired current is the direct current without the portion of the direct current.

11. The apparatus of claim 5 further comprising:
    the Schottky diode configured to control a direction of the direct current.

12. The apparatus of claim 5 further comprising:
    a circuit which includes the voltage multiplier and the voltage regulator.

13. A method for managing an alternating current, the method comprising:
    receiving the alternating current from an energy harvesting device configured to generate the alternating current;
    increasing a voltage of the alternating current, via a voltage multiplier directly connected in series to the energy harvesting device;
    converting, via the voltage multiplier, the alternating current to a direct current;
    adjusting the direct current to a desired current, via a voltage regulator directly connected in series to the voltage multiplier, such that the voltage regulator comprises a zener diode, and
    regulating, via a Schottky diode directly connected in series to the voltage regulator, a direction of the direct current from the voltage regulator to an energy storage device, the energy storage device immediately following in sequence and directly connected to the Schottky diode.

14. The method of claim 13, wherein adjusting the direct current to the desired current comprises:
    adjusting a first voltage of the direct current to a second voltage of the desired current.

15. The method of claim 13, wherein adjusting the direct current to the desired current comprises:
    removing a portion of the direct current by running the portion of the direct current through the zener diode to obtain the desired current, wherein the desired current is the direct current without the portion of the direct current.

16. The method of claim 13 further comprising:
    controlling a direction of the direct current by allowing the direct current to run through the Schottky diode.

17. The method of claim 13, wherein increasing the voltage of the alternating current is performed when the alternating current is converted to the direct current.

18. The method of claim 13 further comprising:
    storing the desired current in the energy storage device.

19. The apparatus of claim 1, wherein the apparatus is a radio frequency identification device tag connected to a wheel assembly of a conveyance device.

20. The apparatus of claim 19, wherein the wheel assembly comprises a number of magnets that rotate with respect to the radio frequency identification device tag to induce the alternating current.

21. The apparatus of claim 19, wherein the conveyance device is one of a cart, a pallet, a dolly, and a roll-a-way.

\* \* \* \* \*